(12) United States Patent
Huang et al.

(10) Patent No.: US 9,797,450 B1
(45) Date of Patent: Oct. 24, 2017

(54) LINEAR GUIDE WITH LUBRICATION DEVICE

(71) Applicant: HIWIN TECHNOLOGIES CORP, Taichung (TW)

(72) Inventors: Bo-Han Huang, Taichung (TW); Lung-Yu Chang, Taichung (TW)

(73) Assignee: HIWIN TECHNOLOGIES CORP, Taichung (TW)

( * ) Notice: Subject to any disclaimer, the term of this patent is extended or adjusted under 35 U.S.C. 154(b) by 0 days.

(21) Appl. No.: 15/144,828

(22) Filed: May 3, 2016

(51) Int. Cl.
*F16C 33/66* (2006.01)
*F16C 29/06* (2006.01)

(52) U.S. Cl.
CPC ...... *F16C 33/6666* (2013.01); *F16C 29/0609* (2013.01); *F16C 29/0611* (2013.01); *F16C 29/0654* (2013.01); *F16C 29/0661* (2013.01); *F16C 33/6611* (2013.01); *F16C 33/6618* (2013.01); *F16C 33/6659* (2013.01)

(58) Field of Classification Search
CPC .............. F16C 29/0609; F16C 29/0654; F16C 29/0661; F16C 33/6666; F16C 29/0611; F16C 29/0652; F16C 33/6611; F16C 33/6618; F16C 33/6655; F16C 33/6659
USPC ...................... 384/13, 15, 44–45, 49, 50, 55
See application file for complete search history.

(56) References Cited

U.S. PATENT DOCUMENTS

| | | | | |
|---|---|---|---|---|
| 6,024,490 | A * | 2/2000 | Shirai ................ | F16C 29/0609 384/13 |
| 6,257,766 | B1 * | 7/2001 | Agari ................. | F16C 29/0609 384/15 |
| 6,290,394 | B1 * | 9/2001 | Obara ................. | B23Q 11/124 384/13 |
| 7,435,000 | B2 * | 10/2008 | Neufang ............. | F16C 29/0661 384/13 |
| 7,534,042 | B2 * | 5/2009 | Kuwabara ........... | F16C 29/0609 384/13 |
| 7,543,684 | B2 * | 6/2009 | Chin-Pei ............. | F16C 29/00 184/5 |
| 7,614,790 | B2 * | 11/2009 | Liu ..................... | F16C 29/0609 184/13.1 |

(Continued)

FOREIGN PATENT DOCUMENTS

| JP | 2005337451 | A | * | 12/2005 | .............. | F16C 33/06 |
| JP | 2006057795 | A | * | 3/2006 | .............. | F16C 29/06 |
| TW | DE-102004036755 | A1 | * | 9/2005 | .......... | F16C 29/0642 |

*Primary Examiner* — Marcus Charles
(74) *Attorney, Agent, or Firm* — Leong C. Lei

(57) ABSTRACT

A linear guide with lubrication device includes: a elongate rail; a slide module slidably mounted on the elongate rail and including a slide block and two recirculation members, which are respectively mounted to two end faces of the slide block and include a plurality of recirculation passages, in which at least one of the recirculation members includes a lubricant reservoir and a fixing through hole formed therein such that the lubricant reservoir, the recirculation passage, and the fixing through hole are in communication with each other and the lubricant reservoir receives lubricant filled therein; an application member received in the fixing through hole; a transferring member covering the application member and the transferring member absorbing and transferring lubricant to the application member. Rolling bodies, when moving through the recirculation passage, may contact the application member to have lubricant applied thereto.

4 Claims, 5 Drawing Sheets

(56) References Cited

U.S. PATENT DOCUMENTS

| | | | | |
|---|---|---|---|---|
| 7,798,716 B2* | 9/2010 | Haub | ............... | F16C 29/0609 384/13 |
| 8,167,492 B2* | 5/2012 | Natale | ............... | F16C 29/0609 384/13 |
| 8,641,280 B2* | 2/2014 | Shibuya | ............... | F16C 29/065 384/13 |
| 8,721,180 B2* | 5/2014 | Li | ............... | F16C 33/6681 384/13 |
| 9,222,515 B2* | 12/2015 | Chang | ............... | F16C 33/6659 |
| 9,243,665 B2* | 1/2016 | Kuwabara | ............... | F16C 33/6648 |
| 2003/0164264 A1* | 9/2003 | Luo | ............... | F16C 29/064 184/5 |
| 2006/0215943 A1* | 9/2006 | Agari | ............... | F16C 29/0611 384/13 |
| 2008/0159668 A1* | 7/2008 | Wu | ............... | F16C 29/0609 384/13 |
| 2015/0086140 A1* | 3/2015 | Kuwabara | ............... | F16C 33/6648 384/13 |

* cited by examiner

LINEAR GUIDE WITH LUBRICATION DEVICE

TECHNICAL FIELD OF THE INVENTION

The present invention relates generally to a linear guide, and more particularly to a linear guide with lubrication device.

DESCRIPTION OF THE PRIOR ART

For precision transmission devices, what are commonly used includes linear guides and ball screws. Both linear guide and ball screw comprise a moving component movable along an elongate rail. To improve lubrication between the moving component and the elongate rail, a lubrication device is commonly arranged between the moving component and the elongate rail. As shown in FIG. 5, an elongate rail (11) of a linear guide (10) is provided with a lubricant storage tank (12) mounted thereon. The lubricant storage tank (12) receives and holds therein lubricant. An application structure (14) is arranged between a moving component (13) slidably mounted to the elongate rail (11) and the lubricant storage tank (12). Arranged between the application structure (14) and the lubricant storage tank (12) is a connector (15) that includes a lubricant guide member (151). The lubricant guide member (151) of the connector (15) absorbs the lubricant from the lubricant storage tank (12) and transfers the lubricant to the application structure (14) for lubricating rolling grooves formed in the elongate rail (11). However, the lubricant guide member (151) of the linear guide (10) is made of a felt material so that the transfer of the lubricant is achieved through capillarity. As long as there is lubricant left in the lubricant storage tank (12), the lubricant guide member (151) continuously guides the lubricant therefrom so that the lubricant is transferred whether the moving component (13) is moving or not and this leads to leakages of the lubricant.

SUMMARY OF THE INVENTION

In view of the above problems, the primary object of the present invention is to provide a lubrication device that controls the amount of lubricant released without increasing the overall length of a slide module of a linear guide.

To achieve the above object, the present invention provides a linear guide with lubrication device, which comprises: an elongate rail, which comprises an elongated strip like structure extending in a given direction, the direction being defined as an axial direction, the elongate rail being provided, on two opposite sides of the axial direction, with rolling grooves respectively; a slide module, which is slidably mounted on the elongate rail and comprises a slide block and two recirculation members, the slide block being provided with rolling channels respectively corresponding to the rolling grooves such that each of the rolling grooves and the corresponding one of the rolling channels collectively define a loading path, the slide block being further provided with a plurality of recirculation holes each extending through two end faces thereof in the axial direction, the two recirculation members being respectively mounted to the two end faces of the slide block, the two recirculation members being each provided with a plurality of recirculation passages each having two ends respectively connected to and communicating with the loading paths and the recirculation holes such that the loading paths each form, in combination with the recirculation holes and the recirculation passages, a circulation path and the circulation path receives a plurality of rolling bodies disposed therein; wherein at least one of the recirculation members comprises a lubricant reservoir and fixing through holes formed therein such that the lubricant reservoir, the recirculation passages, and the fixing through holes are in communication with each other, the lubricant reservoir receiving lubricant filled therein; an application member, which is arranged in each of the fixing through holes; a transferring member, which is set on and covers the application member, the transferring member absorbing and transferring the lubricant to the application member, such that the rolling bodies, when moving through the recirculation passages, are allowed to contact the application members.

Preferably, the application member and the transferring member are formed of felt and the application member and the transferring member are of different felt densities.

Preferably, the recirculation members each comprise a main body and a cover plate, the main body comprising the lubricant reservoir, the fixing through holes, and a second half flow passage formed therein, the cover plate comprising a first half flow passage formed therein to correspond to the second half flow passage, the first half flow passage and the second half flow passage collectively define the recirculation passage.

Preferably, the application member has outline contour corresponding to the fixing through hole.

Preferably, the recirculation members each comprise a positioning lid, the positioning lid being set on and covering the lubricant reservoir and holding and thus fixing the transferring member in position.

The present invention comprises a transferring member that covers an application member, such that the application member is not allowed to directly absorb lubricant so as to reduce the amount of the lubricant released. Further, since the lubricant can be released only when the application member is in contact with the rolling bodies, in case the rolling bodies in a recirculation passage are not in contact with the application member, the application member releases no lubricant. Further, the application member and the transferring member are made of felt materials having different densities, and generally, the density of the application member is set to be larger than that of the transferring member (an opposite arrangement being also operable). As such, the rate of releasing lubricant by the application member can be controlled. In addition the difference of density of the felt materials used can be adjusted according to the applications thereof to different industries and thus, the present invention helps improve universality of the lubrication device. Further, since the space where the lubricant is held and stored is an idle space in a main body of a recirculation members, there is no need to additionally provide a lubricant tank for storage of lubricant and thus, the overall length of the slide module is not changed.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
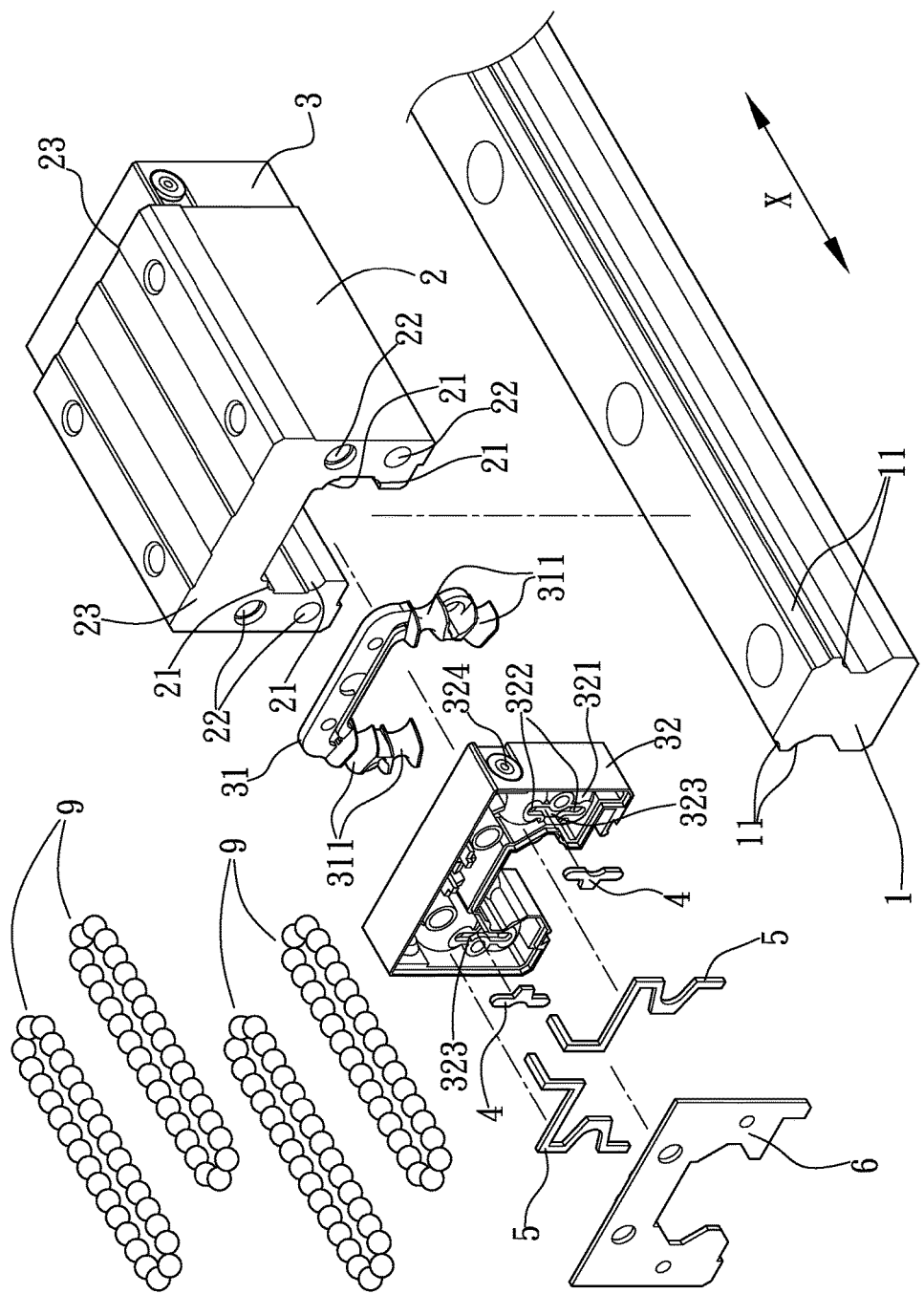
FIG. 1 is an exploded view illustrating a linear guide with lubrication device according to the present invention.
Figure 2:
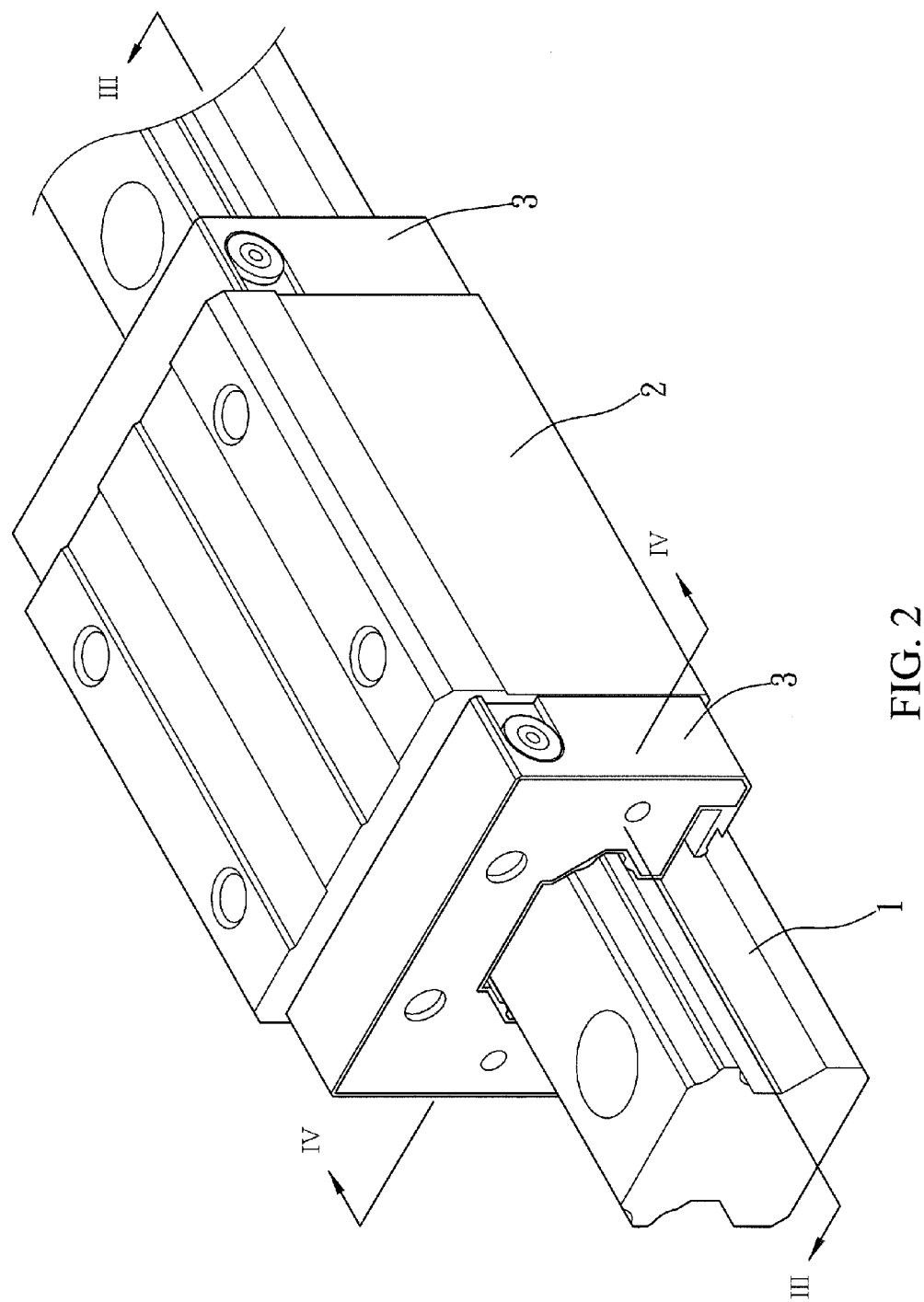
FIG. 2 is an assembled view of the linear guide with lubrication device according to the present invention.
Figure 3:
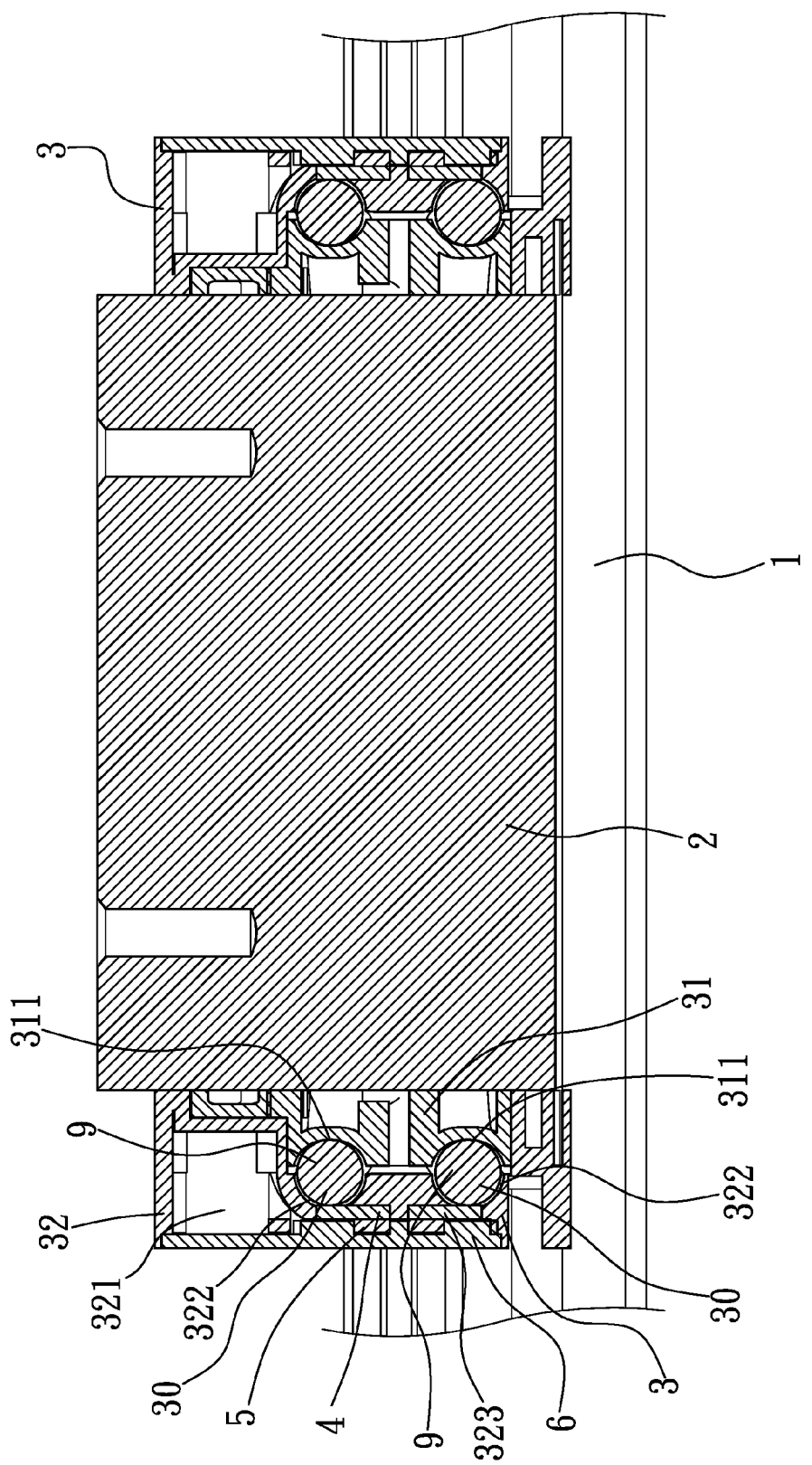
FIG. 3 is a cross-sectional view taken along line III-III of FIG. 2.
Figure 4:
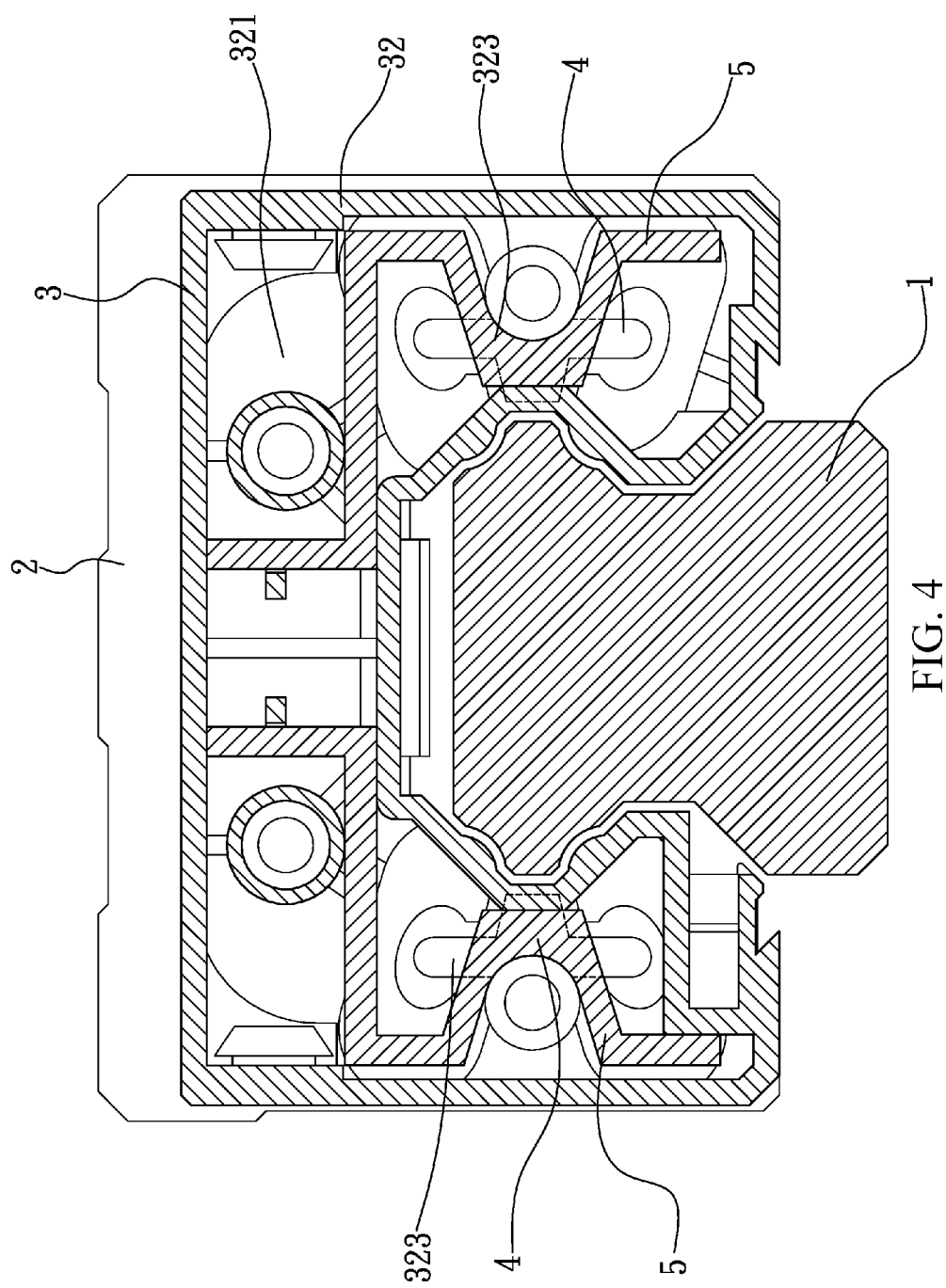
FIG. 4 is a cross-sectional view taken along line IV-IV of FIG. 2.
Figure 5:
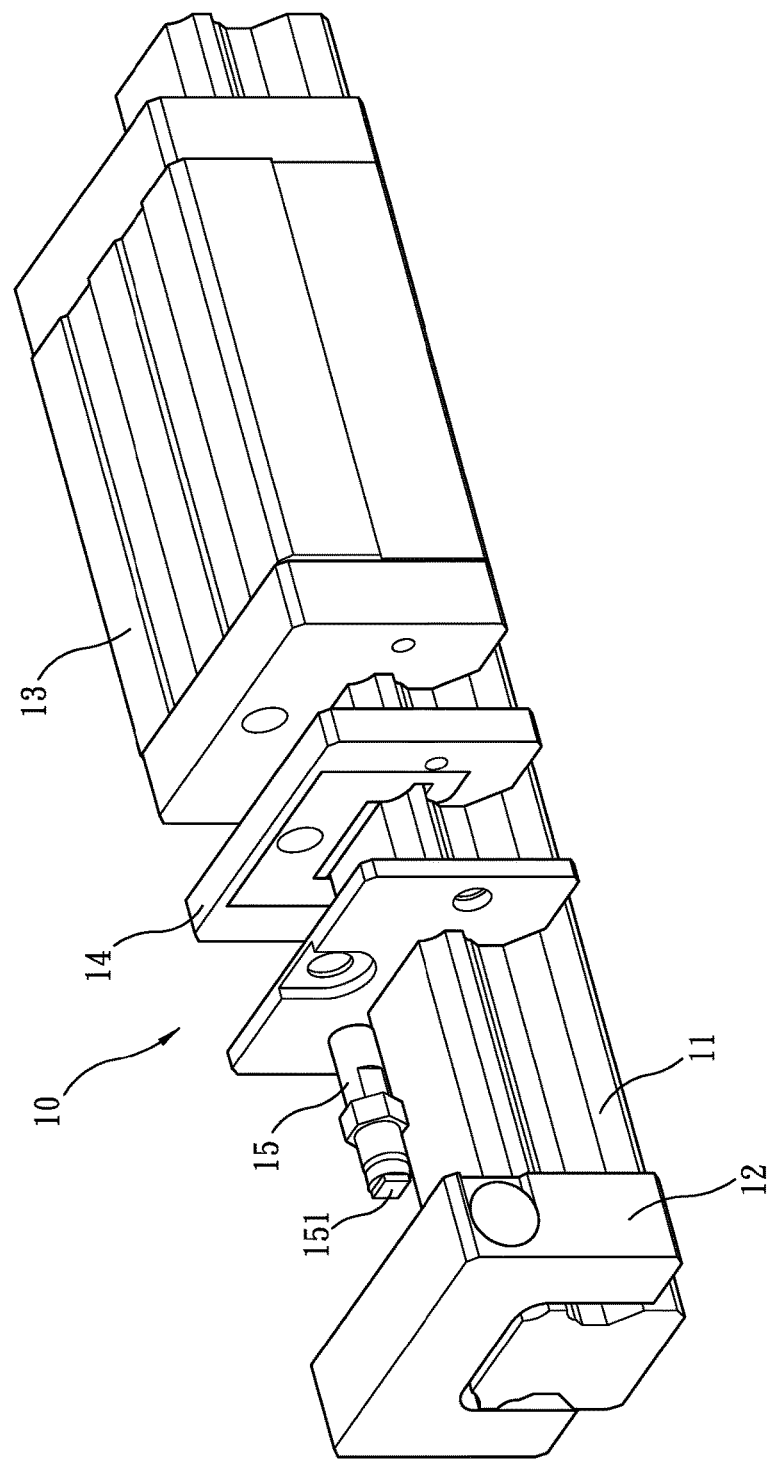
FIG. 5 is a perspective view showing a conventional linear guide with lubrication device.

Referring to FIGS. 1-4, the present invention provides a linear guide with lubrication device, which comprises: an elongate rail (1), which comprises an elongated strip like structure extending in a given direction. The direction is defined as an axial direction (X). The elongate rail (1) is provided, on two opposite sides of the axial direction (X), with rolling grooves (11) respectively. A slide module that is slidably mounted on the elongate rail (1) comprises a slide block (2) and two recirculation members (3). The slide block (2) is provided with rolling channels (21) respectively corresponding to the rolling grooves (11) such that each of the rolling grooves (11) and the corresponding one of the rolling channels (21) collectively define a loading path. The slide block (2) is further provided with a plurality of recirculation holes (22) each extending through two end faces (23) thereof in the axial direction (X). The two recirculation members (3) are respectively mounted to the two end faces (23) of the slide block (2). The two recirculation members (3) are each provided with a plurality of recirculation passages (30) each having two ends respectively connected to and communicating with the loading paths and the recirculation holes (22). The loading paths each form, in combination with the recirculation holes (22) and the recirculation passages (30), a circulation path, and the circulation path receives a plurality of rolling bodies (9) disposed therein. At least one of the recirculation members (3) comprises a lubricant reservoir (321) and fixing through holes (323) formed therein such that the lubricant reservoir (321), the recirculation passages (30), and the fixing through holes (323) are in communication with each other. The lubricant reservoir (321) receives lubricant filled therein. In the instant embodiment, for easy manufacturing of the recirculation members through injection molding, the recirculation members (3) are each structured as a combination of a main body (32) and a cover plate (31). The main body (32) comprises the lubricant reservoir (321), the fixing through holes (323), and second half flow passages (322) formed therein and the cover plate (31) comprises first half flow passages (311) formed therein to correspond to the second half flow passages (322) such that the first half flow passages (311) and the second half flow passages (322) collectively define the recirculation passages (30). An application member (4) is arranged in each of the fixing through holes (323). In the instant embodiment, the application member (4) has a configuration or contour or outline that corresponds to the fixing through hole (323) such that the application member (4) is received, in the entirety thereof, in the fixing through hole (323). A transferring member (5) is set on and covers each of the application members (4). The recirculation members (3) each comprise a positioning lid (6). The positioning lid (6) is set on and covers the lubricant reservoir (321) and holds and thus fixes the transferring members (5) in position. The transferring members (5) may absorb the lubricant and transfers the lubricant to the application members (4), such that the rolling bodies (9), when moving through the recirculation passages (30), are allowed to contact the application members (4) such that the rolling bodies (9) may be applied with and thus coated with the lubricant and thus, in entry into the loading paths, a lubricant film is formed between the rolling bodies (9) and the rolling grooves to help improve the lifespan of the linear guide. The application members (4) and the transferring members (5) are formed of felt and the application members and the transferring members are of different felt densities. The densities of the felt can be adjusted according to the environment in which the linear guide is used.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A linear guide with lubrication device, comprising: an elongate rail, which comprises an elongated strip like structure extending in a given direction, the direction being defined as an axial direction, the elongate rail being provided, on two opposite sides of the axial direction, with rolling grooves respectively; a slide module, which is slidably mounted on the elongate rail and comprises a slide block and two recirculation members, the slide block being provided with rolling channels respectively corresponding to the rolling grooves such that each of the rolling grooves and the corresponding one of the rolling channels collectively define a loading path, the slide block being further provided with a plurality of recirculation holes each extending through two end faces thereof in the axial direction, the two recirculation members being respectively mounted to the two end faces of the slide block, the two recirculation members being each provided with a plurality of recirculation passages each having two ends respectively connected to and communicating with the loading paths and the recirculation holes such that the loading paths each combining the recirculation holes and the recirculation passages to form a circulation path and the circulation path receives a plurality of rolling bodies disposed therein; wherein at least one of the recirculation members comprises a lubricant reservoir and fixing through holes formed therein such that the lubricant reservoir, the recirculation passages, and the fixing through holes are in communication with each other, the lubricant reservoir receiving lubricant filled therein; an application member, which is arranged in each of the fixing through holes; a transferring member, which is set on and covers the application member, the transferring member absorbing and transferring the lubricant to the application member, such that the rolling bodies, when moving through the recirculation passages, are allowed to contact the application members;

wherein the recirculation members each comprise a positioning lid, the positioning lid being set on and covering the lubricant reservoir and holding and thus fixing the transferring member in position.

2. The linear guide with lubrication device according to claim 1, wherein the application member and the transferring member are formed of felt and the application member and the transferring member are of different felt densities.

3. The linear guide with lubrication device according to claim 1, wherein the recirculation members each comprise a main body and a cover plate, the main body comprising the lubricant reservoir, the fixing through holes, and a second half flow passage formed therein, the cover plate comprising a first half flow passage formed therein to correspond to the second half flow passage, the first half flow passage and the second half flow passage collectively define the recirculation passage.

4. The linear guide with lubrication device according to claim 1, wherein the application member has outline contour corresponding to the fixing through hole.

* * * * *